United States Patent [19]

Gordon et al.

[11] Patent Number: 4,743,391

[45] Date of Patent: May 10, 1988

[54] METHOD FOR OXIDATIVELY DEGRADING AN OLEFINIC POLYMER

[75] Inventors: Chester D. Gordon, El Sobrante; Gian L. Fagan, Benicia, both of Calif.

[73] Assignee: Chevron Research Company, San Francisco, Calif.

[21] Appl. No.: 479,380

[22] Filed: Mar. 28, 1983

[51] Int. Cl.$^4$ .............................................. C01M 7/16
[52] U.S. Cl. ..................................................... 252/55
[58] Field of Search .......................................... 252/55

[56] References Cited

U.S. PATENT DOCUMENTS

| | | | |
|---|---|---|---|
| 2,956,953 | 10/1960 | Whitney | 252/55 |
| 3,110,708 | 11/1963 | Wisseroth et al. | 260/93.7 |
| 3,153,025 | 10/1964 | Bush et al. | 260/88.2 |
| 3,232,917 | 2/1966 | McCall et al. | 260/93.7 |
| 3,316,177 | 4/1967 | Dorer | 252/51.5 |
| 3,388,067 | 6/1968 | Takashima et al. | 252/55 |
| 3,404,091 | 10/1968 | Takashima et al. | 252/50 |
| 3,417,020 | 12/1968 | Preuss et al. | 252/52 |
| 3,687,849 | 8/1972 | Abbott | 252/47.5 |
| 3,687,905 | 8/1972 | Dorer | 260/78 |
| 3,756,954 | 9/1973 | Abbott et al. | 252/55 |
| 3,769,216 | 10/1973 | Gordon et al. | 252/51.5 |
| 3,785,980 | 1/1974 | Wilgus | 252/51.5 |
| 4,112,208 | 9/1978 | McConnell et al. | 526/57 |

FOREIGN PATENT DOCUMENTS 2040296 12/1979 United Kingdom ................. 210/18

OTHER PUBLICATIONS

Hawley, G. G., "The Condensed Chemical Dictionary", 1977, 9th Edition, p. 453, Hydroperoxide; p. 663, Peroxide.

Primary Examiner—William R. Dixon, Jr.
Assistant Examiner—C. A. Prezlock
Attorney, Agent, or Firm—S. R. LaPaglia; V. J. Cavalieri; C. J. Caroli

[57] ABSTRACT

A method for oxidatively degrading an olefinic polymer in the absence of molecular oxygen and utilizing an oxidant mixture of a peroxide and hydroperoxide is disclosed. Lubricating oils containing the products of the oxidation process as well as the products post-reacted with funtional group-containing compounds show improved viscosity index and dispersancy properties.

12 Claims, No Drawings

METHOD FOR OXIDATIVELY DEGRADING AN OLEFINIC POLYMER

1. FIELD OF THE INVENTION

The present invention relates to a method for oxidatively degrading an olefinic polymer, to the oxidized polymer so-produced, and to the oxidized polymer post-reacted with functional group-containing compounds. The invention also relates to lubricating oil compositions containing these polymers.

2. DESCRIPTION OF THE PRIOR ART

An important property of a lubricant composition is the rate at which its viscosity changes as a function of temperature. The relationship between the viscosity and temperature is commonly expressed in terms of the viscosity index (V.I.). Lubricant compositions which change little in viscosity with variations in temperature have greater viscosity index than do compositions whose viscosity is materially affected by changes in temperature. It is readily apparent, therefore, that one of the major requirements of lubricating oils or other hydrocarbon oil products is their satisfactory viscosity-temperature characteristics. These characteristics are necessary in order that the oil's viscosity will not become too low but will show an equally good performance within a relatively wide temperature range to which it may be exposed in service. The wider the possible temperature variations, the smaller should be the change in viscosity with temperature. Hence, the viscosity-temperature characteristics of a lubricant which is used in applications where wide variations in temperature are encountered are of great importance and lubricant compositions having high viscosity indices are highly desirable.

A variety of polymeric or high molecular weight materials have been described as viscosity index improvers for lubricants and have been prepared via an air of oxygen sparging oxidation process which involves the use of molecular oxygen in at least one step in the preparation thereof. For example: U.S. Pat. No. 3,417,020 teaches lubricating oil compositions of improved viscosities containing degraded ethylene-alphaolefin polymers wherein the degraded polymers have been hydroxylated. The hydroxylated degraded polymers are prepared by hydroperoxidizing the polymer with subsequent reduction of the hydroperoxide groups to yield degraded products containing hydroxyl groups and minor amounts of carboxyl, keto and aldehyde groups.

U.S. Pat. No. 3,756,954 teaches the preparatiion of viscosity index improvers prepared by air oxidation of interpolymers of ethylene and propylene in the presence of an aliphatic amine.

British Pat. No. 2,040,296A teaches the preparation of a viscosity index improver additive by oxidatively and mechanically degrading an ethylene copolymer containing as one of its components from 0.05 to 3% of 2,5-norbornadiene.

U.S. Pat. No. 3,316,177 teaches reaction of polyamine with the reaction product of maleic anhydride with an oxidized interpolymer of ethylene and propylene, as a sludge dispersant in lubricant and fuel compositions.

U.S. Pat. No. 3,404,091 describes the preparation of nitrogen containing polymers, useful as sludge dispersants and viscosity index improvers, by grafting polar monomers such as acrylonitrile onto hydroperoxidized ethylene-propylene copolymers.

U.S. Pat. No. 3,687,849 describes the preparation of viscosity index improvers, pour point depressants and dispersants, for fuels and lubricants, by grafting various unsaturated monomers onto a degraded, oxidized, interpolymer of ethylene and propylene.

U.S. Pat. No. 3,687,905 describes the preparation of additives for fuels and lubricants by the reaction of an unsaturated acid, such as maleic acid or anhydride, with an oxidized, degraded interpolymer of ethylene and propylene, followed by reaction with a polyamine.

U.S. Pat. No. 3,769,216 discloses the preparation of lube oil additives by the condensation of an amine with an oxidized ethylene-propylene copolymer, prepared by air blowing in the presence of a peroxide (also see U.S. Pat. No. 3,785,980), or by mastication of the polymer in the presence of oxygen.

While not related to the preparation of viscosity index improvers, other oxygen-sparging oxidation methods applied to olefinic polymers are described in the prior art, for example, in U.S. Pat. Nos. 3,153,025, 3,110,708 and 3,232,917.

With respect to these prior art methods, there is considerable concern about the safety aspects such as the possibility of an explosion using air oxidation of an olefinic polymer solution involving relatively large quantities of molecular oxygen and a large volume of hydrocarbon. It has now been found that the oxidation of olefinic polymers is advantageously carried out in solution using a mixture of organic peroxide and hydroperoxide as the oxidizing agent.

This system is preferred because it forms a single-reaction phase with the polymer solution, it is relatively non-corrosive, and it does not have the hazards associated with the air oxidation of hydrocarbons.

3. SUMMARY OF THE INVENTION

The invention advantageously provides an effective method of oxidatively degrading the molecular weight of an olefinic polymer in the absence of molecular oxygen, to the polymer obtained by said method and to a lubricating oil composition containing the oxidized olefinic polymer. The invention also concerns the oxidized polymer post-reacted with functional group-containing compounds and to lubricating oil compositions containing these reaction products.

More specifically, the method of oxidatively degrading an olefinic polymer in the absence of molecular oxygen comprises oxidizing an olefinic polymer in a solvent in the presence of an oxidant mixture of a peroxide and hydroperoxide, wherein said oxidant mixture is present in sufficient amount to effect molecular weight degradation and the molar ratio of peroxide to hydroperoxide is in the range of from 3.2 to 1 to 0.4 to 1.

The oxidized polymer may be post-reacted with functional group-containing compounds such as one or more non-tertiary nitrogen containing compounds. Both the oxidized polymer and the functionalized derivatives thereof are viscosity-index improving agents for lubricating oils. The polymers so produced also show excellent dispersancy properties in lubricating oils and have excellent thickening power and shear stability.

4. DETAILED DESCRIPTION OF THE INVENTION

The term "olefinic polymer" refers to polymers derived from olefinically unsaturated hydrocarbon monomers. The polymer may be either a homopolymer, a copolymer, which term includes random, and block copolymers, and terpolymers, tetrapolymers, etc. Suitable homopolymers include polybutenes, such as polyisobutene having an $\overline{M}_n$ in the range 5,000 to 60,000, preferably in the range 10,000 to 45,000. Suitable copolymers include ethylene copolymers, such as ethylene/propylene, e.g., ethylene/propylene copolymers containing from about 20 to about 65, preferably from about 35 to about 45 mole percent propylene and having an $\overline{M}_n$ in the range 10,000 to 200,000, preferably from 20,000 to 70,000 and copolymers of a vinyl aromatic monomer, e.g., styrene, alphamethyl styrene and vinyl naphthalene and a conjugated diene monomer, e.g., butadiene and isoprene, of which hydrogenated block copolymers containing from about 10 to 40, preferably from 15 to 35 weight percent of the vinyl aromatic monomer and having an $\overline{M}_n$ in the range 25,000 to 125,000, preferably from 50,000 to 125,000, are preferred. Such polymers are described in, for example, U.S. Pat. Nos.: 3,994,815; 3,775,329; 3,668,125 and 3,763,044. Suitable random copolymers are described in for example, U.S. Pat. Nos.: 3,554,911; 3,630,905; 3,752,767 and 3,772,169, Suitable terpolymers include terpolymers of ethylene, a $C_3$ to $C_8$ straight-or branched-chain alpha-olefin, e.g., propylene, and a nonconjugated acyclic or alicyclic diolefin, e.g., 1,4-hexadiene, 1,5-heptadiene, 1,6-octadiene, 1,4-cyclohexadiene, 5-methylene-2-norbornene and 5-ethylidene-2-norbornene, containing from 30 to 85, preferably from 40 to 70 mole percent ethylene, from 15 to 70, preferably from 30 to 60 mole percent alpha-olefin and from 0.5 to 20 mole percent, preferably from 1 to 15, even more preferably from 2 to 10 mole percent diene and having an $\overline{M}_n$ in the range from about 15,000 to about 200,000, preferably from 20,000 to about 70,000. Preferred terpolymers are terpolymers of ethylene, propylene and 1,4-hexadiene or 5-ethylidene-2-norbornene. Suitable tetrapolymers include tetrapolymers of ethylene, a $C_3$ to $C_8$ straight-or branched-chain alpha-olefin and two non-conjugated acyclic or alicyclic diolefins. The preparation of the terpolymers, using Ziegler-Natta catalysts, is described, for example, in U.S. Pat. Nos.: 2,933,489; 3,000,866 and 3,093,621. These terpolymers and tetrapolymers, which are primarily produced for use in elastomeric compositions, are characterized by the absence of chain or backbone unsaturation and contain sites of unsaturation in groups which are pendant to or in cyclic structures outside of the main polymer chain. It is an advantage of the present invention that oxidation occurs substantially on the main backbone chains of the polymers in preference to the groups pendant to or outside the backbone chain.

Mixtures of polymers may also be used, if so desired, in the process of the invention. Thus blends may be formulated to provide desirable properties, e.g., improved low temperatures thickening. Suitable mixtures of polymers include mixtures of two or more ethylene/propylene copolymers having different ethylene-propylene ratios and/or molecular weights and mixtures of an ethylene/propylene copolymer and a polyisobutene.

In accordance with the present invention, the heretofore mentioned olefinic polymers are employed as starting materials in a controlled oxidation reaction using a mixture of at least one peroxide and at least one hydroperoxide referred to hereinabove as the oxidant mixture. More specifically, the oxidized olefinic polymers which are used in the compositions of this invention are prepared by dissolving the olefinic polymer in an inert solvent at a temperature in the range of from about 60° C. to 250° C. using agitation. The mixture of radical initiators is added to the reaction medium under a pressure of from 0 to 1,000 psig and the reaction is continued for a period of from about 0.05 to 20 hours. There is essentially no introduction of oxygen from a separate source into the reaction medium during the oxidation reaction.

The final polymeric product may be recovered from solution by evaporation of the solvent or by precipitation with a non-solvent or by any other suitable method. Alternatively, prior to removal of the inert solvent, a lubricating oil may be added directly to the reaction mixture and the inert solvent removed by vacuum distillation.

The oxidized olefinic polymer can be made in batch or continuous operation. In batch operation, the individual components are added to a suitable reaction vessel together or in discrete portions and dissolved in an inert solvent. In continuous operation the reactant or reactants are added continuously to a horizontal or vertical reaction zone at appropriate feed rates in diluent or neat at temperatures to promote easy handling, reaction and solubility.

The compositions of this invention have a thickening power in the range of about 10–35 cSt. "Thickening power" as used herein is defined as the viscosity at 100° C. of a neutral oil having a viscosity at 40° C. of 28.6 cSt and at 100° C. of 4.7 cSt, containing 2.8 weight percent of the dry polymeric composition. Thickening power is thus measured as an actual viscosity of the oil due to incorporation of the polymer. Thickening power is directly related to the molecular weight of the polymer, but is used instead of molecular weight because the ease of measurement and greater practical significance of data. While the thickening power of the composition of this invention may be broadly defined as being in the range of 10–35 cSt, thickening power is more usually in the range of 15–25 cSt.

The oxidation is carried out in the presence of a mixture of at least one peroxide and at least one hydroperoxide in the mole rato of peroxide to hydroperoxide 3.2:1 to 0.4:1 and preferably 1.7:1 to 0.8:1. Surprisingly, it has been found that use of the combination is much more efficient in oxidizing and degrading the olefinic polymer than the use of either the peroxide or hydroperoxide alone.

Representative of the peroxides used in the mixture include, for example, cumene peroxide, dicumyl peroxide, benzoyl peroxide, dilauryl peroxide, di(n-propyl)-peroxydicarbonate, tertiary butylperoxyisobutyrate, 2,5-dimethyl-2,5-di(t-butylperoxy) hexane, acetyl cyclohexylsulfonyl peroxide, and the like. Representative of the hydroperoxides include, for example, cumene hydroperoxide, hydrogen peroxide, tertiary butyl hydroperoxide, 2,5-dihydroperoxy-2,5-dimethylhexane, and the like. It is also possible to use a single compound or mixture of compounds which contain one or more of each of a hydroperoxy and a peroxide group. The concentration of the mixture relative to the polymer in solution is in the range of from about 2 to 15 percent and preferably 5 to 12%.

The oxidation is carried out in solvents relatively inert to the reaction conditions. Solvents such as toluene, xylene, hexane, or mineral neutral oils can be used. Preferred solvents are benzene, chlorobenzene, t-butylbenzene and the like. The solvent may suitably be present in an amount in the range of from 20 to 99%, preferably from 50 to 95%, and even more preferably from 70 to 90% by weight, based on the weight of the olefinic polymer.

The product produced by the oxidation reaction is an oil-soluble product of lower molecular weight than the starting material. The molecular weight depends upon the extent and conditions employed during the oxidation reaction. Ultimately, the intermediate oxidized polymers are converted by oxidation reactions to fragmented or degraded polymer materials containing carbonyl groups. The more vigorous the oxidation conditions and the longer the length of time maintaining such conditions, the greater the number of carbonyl groups introduced into the starting material. It is sufficient, however, that on an average at least one carbonyl, preferably in the form of a carboxyl-carbonyl, is introduced into each molecule of the starting material.

The oxidized polymer materials have viscosity average molecular weight of from about one-half to about one-tenth of the molecular weight of the original material. The product of the oxidation process will have from about 0.01% about 1% by weight oxygen and preferably in the range of from 0.2% to 0.8% oxygen by weight.

Another aspect of the invention also provides a finished lubricating oil composition comprising a base oil of lubricating viscosity and a viscosity index improving amount of the oxidized olefinic polymer containing carbonyl groups produced by the method as hereinbefore described. Preferably the polymer is present in the oil in an amount of from 0.05 to 20% by weight.

It is believed that the majority of the carbonyl groups introduced into the polymer, or at least the ethylene/propylene copolymers, by the oxidative method of the present invention tend to be carboxylic acid carbonyl groups rather than aldehydrocarbonyl and ketocarbonyl groups. Carboxylic acid carbonyl and ketocarbonyl groups are favored for the further chemical conversion of the oxidized polymer. The oxidized olefinic polymers may be reacted through their carbonyl groups with a variety of other reagents, e.g., hydrogen or nitrogen, oxygen, sulfur, boron and/or phosphorus-containing compounds to form multifunctional products. It is preferred to react the oxidized olefinic polymers with one or more non-tertiary nitrogen-containing compounds such as ammonia, and organic amines which may be mono; di and polyamines and contain at least one primary or secondary amino group, and, in particular, polyalkylene polyamines having the formula:

$$H_2N(CH_2.CH.NH)_xH \qquad (I)$$
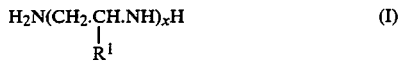

wherein $R^1$ is either hydrogen or a $C_1$ to $C_6$ alkyl group, preferably hydrogen, and x is an integer in the range from 2 to 10, preferably in the range from 2 to 5, to form an nitrogen-containing product having both viscosity index improver and dispersancy properties. Examples of suitable nitrogen-containing compounds include 1,2-diaminoethane; 1,3-diaminopropane; 1,4-diaminobutane; 1,6-diaminohexane; diethylene triamine, triethylene tetramine, tetraethylene pentamine; 1,2-propylene diamine; di-(1,2-propylene) triamine, di-(1,3-propylene) triamine; N,N-di-(2-aminoethyl) ethylene diamine.

Other polyamine compounds that can be used include the N-aminoalkyl piperazines of the formula:

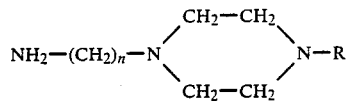

wherein n is a number 1 to 3, and R is hydrogen or an aminoalkyl radical containing 1 to 3 carbon atoms. Specific examples include N-(2-aminoethyl) piperazine, N-(2-aminoisopropyl) piperazine, and N,N'-di-(2-aminoethyl) piperazine.

The alkylene polyamines used in the practice of this invention can be either pure alkylene amines or they can be commercial mixtures. For example, one process for preparing alkylene amines involves the reaction of an alkylene chloride such as ethylene chloride or propylene chloride with ammonia, which results in the production of somewhat complex mixtures of alkylene amines including various piperazines. One useful commercial product is a mixture of ethylene amines prepared by the reaction of ethylene chloride and ammonia and having a composition that corresponds to that of a tetraethylene pentamine. One such mixture is known in the trade under the name "Polyamine H".

Still other alkylene amino compounds that can be used include dialkylamino alkyl amines such as dimethylamino methyl amine, dimethylamino propyl amine, methylpropylamino amyl amine, etc. These may be characterized by the formula:

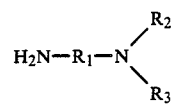

wherein $R_1$ is an alkylene radical, e.g., an ethylene, propylene, or butylene radical, and $R_2$ and $R_3$ are $C_1$ to $C_5$ alkyl radicals.

Other useful amines include N,N-di-(2-hydroxyethyl)-1,3-propylene diamine; 3-dodecyloxypropylamine; N-dodecyl-1,3-propane diamine; tris-hydroxymethyl aminomethane, diisopropanolamine and diethanolamine. There may also be used the mono-succinimide, formed by reacting an alkenyl-succinic anhydride such as polyisobutene succinic anhydride with either a diamine or a polyalkylene polyamine having the formula (I).

The reaction conditions for the reaction of carbonyl groups with nitrogen-containing compounds are well-known in the art. Thus, for example, the condensation of the oxidized rubbery polymers containing a plurality of carbonyl groups and preferably carboxylic acid carbonyl groups with a primary or secondary amine to an aminated carbonyl compound useful as a lubricating oil additive is carried out in the presence of a relatively inert solvent at a temperature of about 100° C. to 280° C. for a period of from about 1 to 24 hours. Typical solvents include the hydrocarbon oil into which the product is designed to be incorporated. Alternatively, another solvent miscible in the lubricating oil and liquid at the reaction temperature may serve as the reaction medium. This would include aromatics such as mixed xylenes, as well as aliphatic oils and halogenated materials such as O-dichlorobenzene. The mole ratio of polyamine to oxidized polymer is in the range of from about 0.2 to about 2.5 moles of amine per mole of oxidized polymer.

Methods for preparing aminated polyolefins are described in U.S. Pat. Nos. 3,785,980; 4,132,661 and 4,317,772 which are expressly incorporated by reference herein.

In a similar manner other preferred derivatives of the oxidized olefinic polymers which are useful as viscosity-index improvers may be formed by reaction with (1) reducing agents or hydrogen to form hydroxylated polymers as described in U.S. Pat. No. 3,388,067, which hydroxylated polymers may be further reacted with isocyanates as described in U.S. Pat. No. 3,404,092, (2) oxygen-containing compounds such as maleic anhydride followed by reaction with a polyamine as described in U.S. Pat. Nos. 3,687,905 and 3,316,177, and (3) sulfur compounds or sulfur compounds and an amine as described in U.S. Pat. Nos. 4,317,738 and 4,320,017, all of the above references with respect to these preferred derivatives being incorporated herein by reference.

Another aspect of the invention also provides a finished lubricating oil composition comprising a major proportion of a base oil of lubricating viscosity as described hereinabove and a minor proportion sufficient to act as viscosity-index improvers of the further-reacted and functionalized oxidized olefinic polymer. Preferably the polymers are present in the oil in an amount of from 0.05% to 10% by weight.

The base lubricating oil used in the compositions of the invention are oils of lubricating viscosity, and particularly of the type useful in internal combustion engines and can be predominantly paraffinic, naphthenic or it can be a mixture of both types of mineral oils, as well as synthetic oils which include polymers of various olefins, generally of from 10 carbon atoms or higher, alkylated aromatic hydrocarbons, etc. In general, the base oil will be a relatively highly refined mineral oil of predominantly a paraffinic nature and will have a viscosity in the range of from 2 to about 20 cSt at 100° C.

Other additives, such as the detergents, rust inhibitors, anti-oxidants, anti-wear agents, etc., may also be present in the finished lubricant. These other additives will be present in conventional concentrations. Preferred additives which may be present in the lubricating oil in effective amounts, and preferably in the concentration range of from 0.01% to 5%, include neutral and overbased alkali and alkaline earth metal sulfonates or phenates or combinations thereof, a metal dihydrocarbyl dithiophosphate such as a zinc dialkyl dithiophosphate and an alkenyl succinimide or succinate or mixtures thereof.

The invention is further illustrated by the following examples, which are given without any intention that the invention be limited thereto.

EXAMPLES

Example 1

A pipe reactor consisting of 25 feet of ½" carbon steel pipe heated by steam tracing was used for this reaction. A solution containing 8% by weight of an ethylene/propylene/1,4-hexadiene terpolymer (a product manufactured by Du Pont Company, Wilmington, Del. and sold under the trade name Ortholeum 2038, which is a terpolymer having about 60 mole percent ethylene groups, 39 mole percent propylene groups and 1 mole percent 1,4-hexadiene groups and having a molecular weight of about 250,000) in chlorobenzene was first pumped through a hot oil heat exchanger and heated to a temperature of 167° C. The solution was then fed into the reactor at 340 gm/min. The reactor was kept at 155° C. using steam and the pressure was maintained at 200 psig. At the front end of the reactor two other solutions were pumped in—a 50% by weight dicumylperoxide in chlorobenzene at 2 ml/min. and 8% by weight hydrogen peroxide in water at 8 ml/min. At the end of the reactor 100 Neutral oil was line mixed with the reaction mixture at 272.4 gm/min.

50 gallons of the reaction mixture containing oil was stripped in a 100 gal. glass kettle at 300° F. and 20 mm Hg for 1 hour. Then, it was transferred to a 50 gal stainless steel kettle and stripped at 400° F. and 20 mm Hg for 1 hour.

The final product has the following properties:
Viscosity at 100° C. (9.75% polymer product by weight)=281.6 cSt
Viscosity of 2.8% solution in 100N oil=17.0 cSt (Thickening Power)

Example 2

Above product was line mixed with a 3.75% solution of ethylene diamine (EDA) in $C_{7-9}$ aromatic hydrocarbon solvent mixture. The polymer solution was pumped at 133.5 ml/min. and the EDA solution was pumped at 33.4 ml/min. The total mixture was then fed into a wiped film evaporator kept at 450° F. The stripped product was filtered through a 100μ filter and had the following properties:
Flash Point=390° F.
Viscosity at 100° C. (9.75% by weight product)=426.4 cSt
Viscosity of 2.8% solution in 100N oil=20.7 cSt (at 100° C.)
Nitrogen content=149 ppm.

Multi-grade lubricating oils with good dispersancy and sheer stability may be prepared using the product of this Example.

Example 3

A pipe reactor consisting of 25 feet of ½" carbon steel pipe heated by steam tracing was used for this reaction. A solution containing 8% by weight of the ethylene/propylene/1,4-hexadiene terpolymer of Example 1 in chlorobenzene was first pumped through a hot oil heat exchanger and heated to a temperature of 216° C. The solution was then fed into the reactor at 0.8 lb/min. The reactor was kept at 188° C. using steam and the pressure was maintained at 200 psig. At the front end of the reactor two other solutions were pumped in—a 6.25% by weight dicumylperoxide in chlorobenzene at 2 ml/min. and a 25% by weight cumene hydroperoxide in chlorobenzene at 9.2 ml/min. At the end of the reactor 100 Neutral oil was line mixed with the reaction mixture at 0.36 lbs/min.

50 gallons of the reaction mixture containing oil was stripped in a 100 gal glass kettle at 300° F. and 20 mm Hg for 1 hour. Then it was transferred to a 50 gal stainless steel kettle and stripped at 400° F. and 20 mm Hg for 1 hour.

The final product has the following properties:
Viscosity at 100° C. (15% polymer product by weight)=2111 cSt
Viscosity of 2.8% solution in 100N oil=19.8 cSt (Thickening Power).

Above product was line mixed with a 3.75% solution of ethylene diamine (EDA) in $C_{7-9}$ aromatic hydrocarbon solvent mixture. The polymer solution was pumped at 133.5 ml/min. and the EDA solution was at 33.4 ml/min. The total mixture was then fed into a wiped film evaporator kept at 450° F. The stripped product was filtered through a 100μ filter and had the following properties:
  Flash Point=300° F.
  Viscosity at 100° C. (15% by weight product)=2558 cSt
  Viscosity of 2.8% solution in 100N oil=20.5 cSt (at 100° C.)
  Nitrogen content=98 ppm.

Multi-grade lubricating oils with good dispersancy and sheer stability may be prepared using the product of this Example.

Example 4

Eighty grams of the ethylene/propylene/1,4-hexadiene terpolymer used in Example 1 was dissolved in 920 gm of chlorobenzene at 110° C. with stirring. The solution was cooled to about 25° C. after which a mixture of cumene hydroperoxide and dicumyl peroxide, in the mole ratios shown in Table I, were added thereto with mixing. The reaction mixture was pumped at 19.7 grams/min. into a 50 ml reactor tube (a one quarter inch stainless steel tubular reactor) which was maintained at 180° C. and 200 psig. The residence time in the reactor was 2.75 min.

To 500 gm of the reacted mixture was added 267 gm of 100 Neutral oil. The chlorobenzene was removed from this mixture by distillation at 200° C. and 20 mm Hg pressure yielding a 15% by weight of the oxidized polymer in oil.

A portion of the final product solution was then diluted to 2.8% by weight polymer using additional 100 Neutral oil. The viscosity of the resulting 2.8% solution at 100° C. in centistokes is what is defined as Thickening Power (TP).

The data in Table I demonstrates the effect of varying the mole ratio of peroxide to hydroperoxide on the thickening power of the oxidized polymer.

| Run No. | Moles Dicumyl Peroxide | Moles Cumene Hydroperoxide | Mole Ratio of Peroxide to Hydroperoxide | TP* |
|---|---|---|---|---|
| 1 | 0.33 | 0.07 | 4.7:1 | 44 |
| 2 | 0.30 | 0.13 | 2.3:1 | 28 |
| 3 | 0.27 | 0.18 | 1.5:1 | 20 |
| 4 | 0.22 | 0.26 | 0.8:1 | 21 |
| 5 | 0.19 | 0.33 | 0.6:1 | 27 |
| 6 | 0.15 | 0.40 | 0.4:1 | 32 |
| 7 | 0.11 | 0.46 | 0.2:1 | 37 |
| 8 | 0.07 | 0.53 | 0.1:1 | 58 |

*TP for starting polymer before oxidation was about 45 cSt

Example 5

To 4000 grams of a chlorobenzene solution containing 8% by weight of the ethylene/propylene/1,4-hexadiene terpolymer used in Example 1 were added in 12.7 grams of cumene hydroperoxide and 29.7 grams dicumyl peroxide with mixing. The reaction mixture was pumped at 33 grams/min. into a 50 ml reactor tube (a one quarter inch stainless steel tubular reactor) which was maintained at 200° C. and 200 psig. The residence time in the reactor was 1.5 min.

To 500 grams the reacted mixture was added 118.13 gm of 100 Neutral oil. The chlorobenzene was removed from this mixture by distillation at 200° C. and 20 mm Hg pressure.

A portion of the final product solution was then diluted to 2.8% by weight polymer using additional 100 Neutral oil. The viscosity (Thickening Power) of the resulting 2.8% solution at 100° C. was 12.7 cSt. The oxygen content of the product as determined by Neutron Activation Analysis was 0.33%. The acid content was 2.8 mmole COOH/100 gm polymer and the hydroxyl content was 0.069 mmoles OH/100 gm polymer.

Multi-grade lubricating oils with good dispersancy and sheer stability may be prepared using the product of this Example.

Example 6

The lubricating oil compositions of this invention were evaluated in the standard Sequence V-D automotive engine test. In the Sequence V-D test, lubricants containing the experimental additives are charged respectively to a standard internal combustion engine. The engine is operated at an assigned load and temperature, and at the end of a prescribed time the engines are disassembled and examined for deposits and wear. This engine test is a standard method well known in the industry.

Also, viscosity measurements at 100° C., 40° C. and 0° C. show acceptable viscosity measurements and with the use of pour point depressants, acceptable viscosity measurements at −32° C. are obtained.

A. Standard Sequence V-D Engine Test

Formulated 10W-30 oils (Exxon 150 neutral) containing the viscosity index improver additives shown in Table I were prepared and tested in a Sequence V-D Test method phase 9-2 (according to candidate test for ASTM) as shown in Table II. This procedure utilizes a Ford 2.3-liter four-cyclinder engine. The test method simulates a type of severe field test service characterized by a combination of low speed, low temperature "stop and go" city driving and moderate turnpike operation. The effectiveness of the additives in the oil is measured in terms of the protection provided against deposits and valve train wear. Each of the formulated 10W-30 oils also contained 3.5% of a polyisobutenyl succinimide (50% by weight concentrate in oil), 20 mmoles/kg overbased calcium sulfonate, 30 mmoles overbased magnesium sulfonate, 18 mmoles dialkyl dithiophosphate, 0.3% dialkyl diphenylamine and 1% of a sulfonate-succinimide reaction product overbased with potassium triborate.

TABLE II

| Average Formulation | Sequence V-D Performance | | | | |
|---|---|---|---|---|---|
| | Piston Sludge | Average Varnish | Cam Lab Wear v. $10^{-3}$ inch Varnish | Avg. | Max. |
| 1.1% Product of Example 1 | 9.5 | 8.0 | 8.4 | 0.4 | 0.6 |
| 1.1% Product of Example 2 | 9.1 | 7.9 | 8.0 | 0.5 | 0.7 |
| 1% Product of Example 3 | 8.6 | 7.8 | 7.7 | 0.5 | 0.8 |
| 0.7% AMOCO 6565[1] | 9.4 | 8.1 | 7.3 | 0.6 | 0.7 |
| 0.7% TLA 555[2] | 9.1 | 7.7 | 8.0 | 0.5 | 0.7 |

[1]Commercial VI Improver - vinyl pyrrolidone grafted onto an ethylene/propylene copolymer.
[2]Commercial VI Improver - oxidized ethylene/propylene copolymer reacted with formaldehyde and an amine.

What is claimed is:

1. A method of oxidatively degrading an olefinic polymer with essentially no introduction of molecular oxygen from a separate source into the reaction medium during the oxidation reaction which comprises oxidizing an olefinic polymer derived from olefinically unsaturated hydrocarbons in a solvent in the presence of an oxidant mixture of a peroxide and hydroperoxide wherein said oxidant mixture is present in sufficient amount to effect molecular weight degradation of said olefinic polymer and the mole ratio of peroxide to hydroperoxide is in the range of from 3.2 to 1 to 0.4 to 1.

2. The method according to claim 1 wherein the olefinic polymer is a copolymer of ethylene and a $C_3$–$C_8$ alpha-olefin.

3. The method according to claim 2 wherein said olefinic polymer is an ethylene-propylene copolymer.

4. The method according to claim 1 wherein the olefinic polymer is a terpolymer of ethylene, a $C_3$–$C_8$ alpha-olefin and one or more nonconjugated acyclic or alicyclic olefins.

5. The method according to claim 4 wherein the olefinic polymer is an ethylene, propylene, and 1,4-hexadiene terpolymer.

6. The method according to claim 1 wherein the oxidizing reaction is carried out within the temperature range of from about 60° to 250° C. and under a pressure of from 0 to 1,000 psig.

7. The method according to claim 1 wherein the oxidant mixture is present in an amount of from about 1% to about 20% by weight.

8. The method according to claim 1 wherein the hydroperoxide of said oxidant mixture is selected from the group consisting essentially of hydrogen peroxide, cumene hydroperoxide, tertiary butyl hydroperoxide, 2,5-dihydroperoxy-2,5-dimethylhexane; and the peroxide of said oxidant mixture is selected from the group consisting essentially of dicumyl peroxide, benzoyl peroxide, and dilauryl peroxide.

9. A method according to claim 1 wherein the oxidant mixture is hydrogen peroxide and dicumyl peroxide.

10. The method according to claim 1 wherein the oxidant mixture is cumene hydroperoxide and dicumyl peroxide.

11. The product obtained according to the method of claim 1.

12. A lubricating oil composition comprising an oil of lubricating viscosity and a viscosity index improving amount of the product of claim 11.

* * * * *